United States Patent [19]

Oyama

[11] 4,386,251
[45] May 31, 1983

[54] FIXTURE FOR PUSH-BUTTON SWITCH

[75] Inventor: Minoru Oyama, Furukawa, Japan

[73] Assignee: Alps Electric Co., Ltd., Tokyo, Japan

[21] Appl. No.: 244,090

[22] Filed: Mar. 16, 1981

[30] Foreign Application Priority Data

Mar. 14, 1980 [JP] Japan .............................. 55-33162[U]

[51] Int. Cl.³ .............................................. H01H 9/00
[52] U.S. Cl. .................................... 200/296; 248/27.1
[58] Field of Search ................ 200/296, 159 R, 153 J,
200/153 SB, 153 E, 153 EA, 5 R, 5 A;
248/27.1, 27.3; 361/331, 350, 427; 339/198 GA

[56] References Cited

U.S. PATENT DOCUMENTS

| | | | |
|---|---|---|---|
| 2,691,702 | 10/1954 | Allison | 200/5 E |
| 2,969,418 | 1/1961 | Benander | 248/27.1 |
| 3,259,699 | 7/1966 | du Temple de Roubemont | 200/5 E |
| 3,562,468 | 2/1971 | Stefani | 200/295 |
| 3,722,313 | 3/1973 | Schadow | 200/5 E |
| 4,100,384 | 7/1978 | Nishioka | 200/5 E |

Primary Examiner—John W. Shepperd
Attorney, Agent, or Firm—Guy W. Shoup; Gerard F. Dunne

[57] ABSTRACT

A fixture for a push-button switch which has an operating lever protrusive from one face of a box-shaped casing thereof, characterized by comprising a mounting frame which is substantially U-shaped in section and which is provided with an opening for leading out the operating lever of the push-button switch, one mounting surface of the mounting frame being provided with a plurality of bulges for positioning the push-button switch in engagement with the casing thereof, the other mounting surface being provided with a pair of tongues protrusive in a direction orthogonal to the moving direction of the operating lever, the pair of tongues being fastened in engagement with the casing of the push-button switch.

7 Claims, 5 Drawing Figures

FIXTURE FOR PUSH-BUTTON SWITCH

BACKGROUND OF THE INVENTION

The present invention relates to a fixture for a push-button switch. More particularly, it relates to improvements in a mounting frame which can reasonably juxtapose a plurality of miniature and thin push-button switches.

In general, a mounting frame for a push-button switches is substantially U-shaped, and a mounting surface of the mounting frame is formed with bendable tongues for holding a push-button switch in engagement therewith. The push-button switch is typically fixed to a mounting frame by bending the tongues. Ordinarily, however, the tongues are formed in a manner to protrude in the same direction as the moving direction of an operating lever of the push-button switch. Accordingly, in case where the operating lever is pushed by a great force or where the switch has been used for a long time, there occurs the disadvantage that the bent portion stretches and that the push-button switch becomes loose or falls from the mounting frame.

SUMMARY OF THE INVENTION

An object of the present invention is to provide A fixture which can reasonably juxtapose a multiplicity of push-button switches.

Another object of the present invention is to provide a fixture for a push-button switch which can firmly hold the push-button switch.

Still another object of the present invention is to provide a fixture for a push-button switch which can fix the push-button switch at a precise position.

The present invention can be provided by tongues formed in a mounting frame so as to protrude in a direction orthogonal to the moving direction of an operating lever of a push-button switch, and that bulges for positioning the switch are formed in the mounting frame.

Further objects and advantages of the present invention will become apparent from the following detailed description taken with reference to the drawings.

DESCRIPTION OF THE PREFERRED EMBODIMENT

Figure 3:
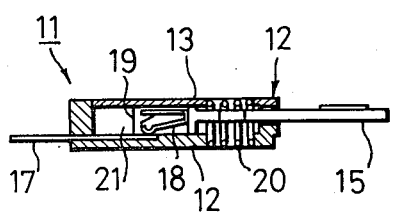
FIG. 3 is a side sectional view of the push-button switch.

An embodiment of the present invention will be described in detail with reference to FIGS. 1 to 5. Numeral 11 designates a push-button switch. The push-button switch 11 includes a substantially box-shaped casing 14 in which a metal plate 13 is mounted on a base 12 made from a synthetic resin. An operating rod 15 protrudes from one face of the casing 14. Numerals 16 indicate engaging grooves provided in the opposing longitudinal sides of the casing 14, and numerals 17 indicate terminals. As shown in FIG. 3, inside the casing 14, a movable contact piece 18, which moves as the operating rod 15 is pressed, is received in a receiving portion 19, and a coiled spring 20 which serves to return the operating rod 15 is received. The movable contact piece 18 slides on terminal plates 21 to change the switch over.

Numeral 22 indicates a mounting frame which is fabricated by bending a metal plate so as to be substantially U-shaped in section. As specifically shown in FIGS. 1 and 2, the mounting frame 22 includes a central surface 23 which is provided with a guide window 24 for receiving the operating rod 15 of the push-button switch 11, and two opposing mounting surfaces 25 and 26 which extend from the central surface 23 substantially perpendicularly thereto. One mounting surface 25 is provided with a plurality of bulges 27 which engage the casings 14 of the push-button switches 11. Two of the bulges 27 are used for positioning each respective push-button switch 11. The other mounting surface 26 is provided with pairs of tongues 28 which extend orthogonally to the moving direction of the operating rods 15 of the push-button switches 11.

Figure 1:
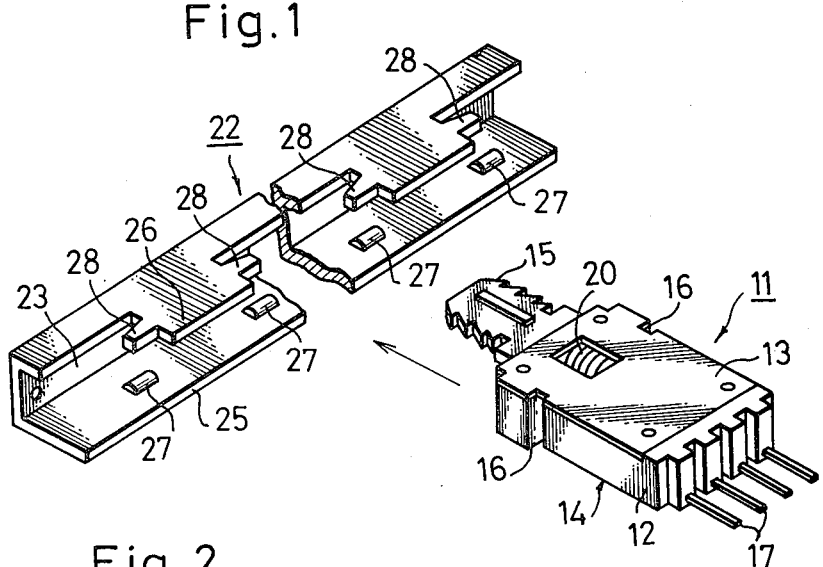
FIG. 1 is an exposed perspective view of a fixture for a push-button switch according to the present invention.
Figure 2:
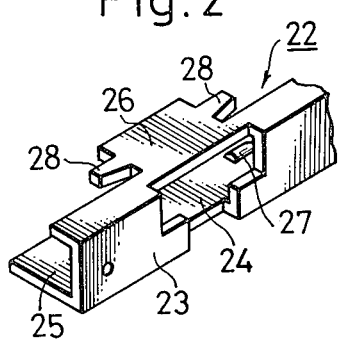
FIG. 2 is a perspective view of a mounting frame of the push-button switch fixture of the present invention.
Figure 4:
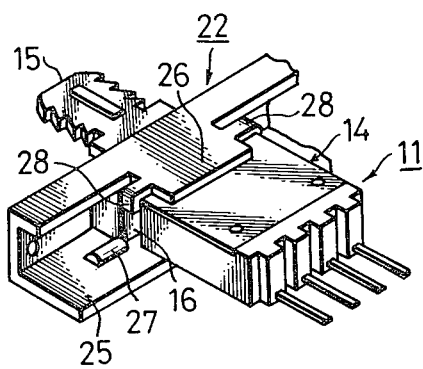
FIG. 4 is a perspective view showing the state in which the push-button switch in FIG. 3 is fixed to the mounting frame in FIG. 2.
Figure 5:
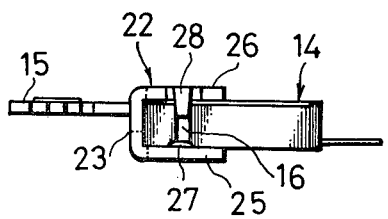
FIG. 5 is a side view corresponding to the state shown in FIG. 4.

Now, the operations of mounting the push-button switch 11 on the mounting frame 22 will be described. The mounting frame 22 and the push-button switch 11 are opposed to each other as shown in FIG. 1, and the push-button switch 11 is moved in the direction of the arrow indicated in the figure. Then, the casing 14 is positioned by the respective bulges 27 while being sandwiched between the two mounting surfaces 25 and 26, and the operating rod 15 is led out through the guide window 24 of the central surface 23. Thereafter, the pair of tongues 28 and 28 provided in the mounting surface 26 are bent towards the other appropriate mounting surface 26. Then, these tongues 28 and 28 are fastened in engagement with the engaging grooves 16 provided in the casing 14. The mounted state is illustrated in FIGS. 4 and 5.

What is claimed is:

1. A fixture for holding at least one push-button switch of the type having an operating lever movable inwardly of the switch, comprising:

a mounting frame formed substantially into a U-shape in section and having a central surface having a respective opening for receiving each said operating lever, and opposing surfaces extending inwardly from said central surface; and respective means including tongues extending from one of said opposing surfaces in directions substantially orthogonal to the direction of movement of the operating lever of each respective switch for holding each said switch to said frame after said tongues have been bent around said switch while remaining orthogonal to the direction of movement of the operating lever of each said switch.

2. A fixture according to claim 1, the other of said opposing surfaces having locator means including bulges formed thereon for positioning each said switch on said surface.

3. A fixture according to claim 2, each said switch having a casing formed with grooves adapted to receive respective tongues.

4. A fixture according to claim 2, said locator means including a respective pair of bulges for each said switch, each said pair of bulges being spaced apart the width of a respective switch.

5. A fixture according to claim 4, said tongues each lying opposite a respective bulge.

6. A fixture according to claim 2, said tongues each lying opposite a respective bulge.

7. A fixture according to claim 1, each said switch having a casing formed with grooves adapted to receive respective tongues.

* * * * *